United States Patent
Onishi et al.

(10) Patent No.: US 10,375,568 B2
(45) Date of Patent: Aug. 6, 2019

(54) COMMUNICATION METHOD IN VEHICULAR WIRELESS COMMUNICATION SYSTEM AND VEHICULAR WIRELESS COMMUNICATION SYSTEM FOR TRANSMISSION OF NECESSARY INFORMATION ONLY FROM A SENSOR TO THE NETWORK

(71) Applicant: TOYOTA JIDOSHA KABUSHIKI KAISHA, Toyota-shi, Aichi (JP)

(72) Inventors: Ryokichi Onishi, Tokyo (JP); Makiko Matsumoto, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 15/326,869

(22) PCT Filed: Jul. 15, 2015

(86) PCT No.: PCT/JP2015/003583
§ 371 (c)(1),
(2) Date: Jan. 17, 2017

(87) PCT Pub. No.: WO2016/009651
PCT Pub. Date: Jan. 21, 2016

(65) Prior Publication Data
US 2017/0215064 A1    Jul. 27, 2017

(30) Foreign Application Priority Data
Jul. 18, 2014  (JP) ................. 2014-148103

(51) Int. Cl.
*H04W 8/20*   (2009.01)
*H04W 12/04*  (2009.01)
*H04W 4/70*   (2018.01)
*H04W 4/04*   (2009.01)
*H04B 1/3822* (2015.01)
*H04L 29/08*  (2006.01)
*H04W 84/12*  (2009.01)

(52) U.S. Cl.
CPC ............ *H04W 8/20* (2013.01); *H04B 1/3822* (2013.01); *H04W 4/046* (2013.01); *H04W 4/70* (2018.02);
(Continued)

(58) Field of Classification Search
CPC ....... H04W 8/20; H04W 12/04; H04W 84/12; H04W 4/70; H04W 4/046
See application file for complete search history.

(56) References Cited

U.S. PATENT DOCUMENTS

| 2004/0259642 A1 | 12/2004 | Tanaka et al. |
| 2015/0327110 A1* | 11/2015 | Jeong ............ H04W 48/20 370/338 |
| 2015/0341830 A1* | 11/2015 | Jeong ............ H04W 24/02 370/329 |

FOREIGN PATENT DOCUMENTS

| JP | 2005-027133 A | 1/2005 |
| JP | 2006-065415 A | 3/2006 |

(Continued)

OTHER PUBLICATIONS

Jiachen Chen et al. "COPSS: An Efficient Content Oriented Publish/Subscribe System".
(Continued)

*Primary Examiner* — Gbemileke J Onamuti
(74) *Attorney, Agent, or Firm* — Oliff PLC

(57) ABSTRACT

In a communication method in a wireless communication system configured from a wireless connection providing apparatus (a wireless LAN access point) and a wireless communication apparatus (a wireless LAN client), the wireless connection providing apparatus acquires subscription information for specifying necessary information and includes the subscription information in a control frame notifying surroundings of presence of itself and then transmits the subscription information. The wireless communi-
(Continued)

cation apparatus receives the control frame, determines whether the wireless communication apparatus retains information which is specified as being necessary by the subscription information included in the control frame. When the wireless communication apparatus retains the information, the wireless communication apparatus establishes connection to the wireless connection providing apparatus and transmits the information. The subscription information can be stored in an ESSID of a beacon frame, for example.

13 Claims, 7 Drawing Sheets

(52) U.S. Cl.
CPC .............. *H04W 12/04* (2013.01); *H04L 67/12* (2013.01); *H04W 84/12* (2013.01)

(56) References Cited

FOREIGN PATENT DOCUMENTS

| | | | |
|---|---|---|---|
| JP | 2007-174303 A | 7/2007 | |
| JP | 2008-061144 A | 3/2008 | |
| JP | 2008-177775 A | 7/2008 | |
| JP | 2009-533954 A | 9/2009 | |
| JP | 2013-102330 A | 5/2013 | |
| JP | 2013-106964 A | 6/2013 | |
| WO | 2007/120447 A1 | 10/2007 | |
| WO | 2012/111255 A1 | 8/2012 | |
| WO | 2013/138711 A1 | 9/2013 | |

OTHER PUBLICATIONS

Tomoyuki Osano et al. "Routing Protocol Using Bloom Filter for Mobile Ad Hoc Network". May 24, 2013, pp. 135-140.

"On-Demand Generation of Location Specific Sensor Data for the Smarter Planet". ip.com Prior Art Database, Aug. 2, 2011, pp. 1-2, XP: 13146755A.

Ernesto Garcia Davis et al. "Presence-Based Architecture for Wireless Sensor Networks Using Publish/Subscribe Paradigm". WWIC 2011, LNCS 6649, pp. 27-38, XP: 47024463A.

Wassim Drira et al. "A Pub/Sub Extension to NDN for Efficient Data Collection and Dissemination in V2X Networks". XP: 32656385A.

Tulika Pandey et al. "Publish/Subscribe Based Information Dissemination Over Vanet Utilizing DHT". Front. Comput. Sci., 2012, vol. 6, No. 6, pp. 713-724.

Tomoyuki Osano et al. "Routing Protocol Using Bloom Filter for Mobile Ad Hoc Network". Oct. 31, 2007, pp. 135-140.

* cited by examiner

HARDWARE CONFIGURATION OF VEHICLE-MOUNTED TERMINAL

FUNCTIONAL BLOCKS OF VEHICLE-MOUNTED TERMINAL

HARDWARE CONFIGURATION OF WIRELESS BASE STATION

FUNCTIONAL BLOCKS OF WIRELESS BASE STATION

COMMUNICATION METHOD IN VEHICULAR WIRELESS COMMUNICATION SYSTEM AND VEHICULAR WIRELESS COMMUNICATION SYSTEM FOR TRANSMISSION OF NECESSARY INFORMATION ONLY FROM A SENSOR TO THE NETWORK

TECHNICAL FIELD

The present invention relates to a communication method in a wireless communication system and, more particularly, to a communication method that makes it possible to determine, before establishing wireless connection, information that needs to be transmitted.

BACKGROUND ART

In recent years, a wireless communication system has been widely spread that collects, through wireless communication, information acquired in various apparatuses and utilizes the information. For example, there is known a probe car system that acquires information such as a driving situation and the like of a vehicle from various sensors in the vehicle. There is also known a sensor network system that includes sensor-equipped nodes scattered in the sensor network system and acquires sensing results from the sensor nodes.

In such a system that collects information, if all the nodes transmit acquired all data, excessive traffic occurs. Therefore, it is conceivable to transmit only necessary information.

For example, Patent Literature 1 discloses that a portable game apparatus establishes a communication state between the portable game apparatus and another game apparatus and, thereafter, the game apparatuses transmit and receive an exchange condition for exchanging game data and, when the exchange condition is met, exchange the game data.

Patent Literature 2 discloses that a wireless base station transmits a transmission request (analysis target determination data) including a predetermined condition (a filtering condition) and vehicle-mounted terminals transmit data only when the predetermined condition is satisfied. It is likely that interference occurs if all the vehicle-mounted terminals are called all at once. However, the interference is prevented by selectively calling only a part of the vehicle-mounted terminals in this way.

In both of Patent Literature 1 and 2, necessity of transmission of data is determined on the basis of information transmitted from a communication partner. Patent Literature 1 and 2 are based on the premise that wireless connection between transmission and reception nodes is established. However, in a system that does not establish wireless connection at normal time and establishes the wireless communication when transmitting data, there is a problem in that, if necessity of transmission is determined by the methods of Patent Literature 1 and 2, useless wireless connection occurs. That is, after wireless connection is performed to acquire subscription information, when it is determined that data transmission is unnecessary, establishment process for the wireless connection is wasted.

Patent Literature 3 discloses that, in a wireless USB system, attribute information indicating as which of a host side and a device side an apparatus itself is operating is included in a beacon and transmitted. Consequently, a wireless USB-adapted apparatus can grasp, simply by receiving the beacon without exchanging complicated commands, as which of the host side and the device side the apparatus is operating.

In the method of Patent Literature 3, by including the attribute information in the beacon and transmitting the attribute information, it is possible to transmit information without establishing wireless communication. However, in the method of Patent Literature 3, even if the apparatus itself receives the beacon, the apparatus itself cannot grasp whether a transmission destination needs data owned by the apparatus itself.

CITATION LIST

Patent Literature

[PTL1] Japanese Patent Application Laid-Open No. 2013-106964
[PTL2] Japanese Patent Application Laid-open No. 2006-65415
[PLT3] Japanese Patent Application Laid-open No. 2008-61144
[PLT4] Japanese Patent Application Laid-open No. 2008-177775
[PTL5] Japanese Patent Application Laid-open No. 2005-27133
[PLT6] Japanese Patent Application Laid-open No. 2013-102330

SUMMARY OF INVENTION

It is an object of the present invention to, in a wireless communication system in which a wireless communication apparatus selectively transmits necessary data, make it possible to determine, before establishing wireless communication, whether the wireless communication apparatus retains the necessary data.

In order to attain the object, according to a first aspect of the present invention, there is provided a communication method in a wireless communication system configured from a wireless connection providing apparatus that provides wireless connection and a wireless communication apparatus capable of performing wireless communication with the wireless connection providing apparatus, the communication method including:

a subscription-information acquiring step of operating the wireless connection providing apparatus to acquire subscription information for specifying necessary information;

a control-frame transmitting step of operating the wireless connection providing apparatus to include the subscription information in a control frame notifying surroundings of presence of the wireless connection providing apparatus and then transmit the subscription information and;

a control-frame receiving step of operating the wireless communication apparatus to receive the control frame;

a determining step of operating the wireless communication apparatus to determine whether the wireless communication apparatus retains information, which is specified as being necessary by the subscription information included in the control frame; and an information transmitting step of operating, when determination is made in the determining step that the wireless communication apparatus retains the information, the wireless communication apparatus to establish connection to the wireless connection providing apparatus and transmit the information.

With the configuration explained above, the subscription information is stored in the control frame for notifying surroundings of the presence of the wireless connection providing apparatus and transmitted. Therefore, the wireless communication apparatus can determine, on the basis of the subscription information included in the control frame, whether the wireless communication apparatus retains necessary information. The wireless communication apparatus can avoid useless wireless connection by establishing wireless connection only when the wireless communication apparatus retains the necessary information.

In the present invention, a wireless communication system of communication between the wireless connection providing apparatus and the wireless communication apparatus may be a wireless LAN. In the control-frame transmitting step, the wireless connection providing apparatus may include the subscription information in an ESSID of a beacon before transmitting the subscription information.

In the present invention, the connection between the wireless connection providing apparatus and the wireless communication apparatus may be established by a procedure conforming to a Hotspot 2.0 standard. In the control-frame transmitting step, the wireless connection providing apparatus may include the subscription information in an Operator Friendly Name in an ANQP Response before transmitting the subscription information.

The beacon in the wireless LAN and the ANQP Response in the Hotspot 2.0 are equivalent to the control frame for notifying the surroundings of the presence of the wireless connection providing apparatus. Any data can be stored in the ESSID in the wireless LAN and the Operator Friendly Name in the Hotspot 2.0. Therefore, by including the subscription information in this field, it is possible to notify the subscription information from the wireless connection providing apparatus to the wireless communication apparatus via the control frame. Note that, in this specification, the "control frame" indicates a frame other than a data frame. For example, a management frame in the wireless LAN is equivalent to the control frame in this specification.

It is also preferable that, in the subscription-information acquiring step, the wireless connection providing apparatus receives the subscription information from a database server, and the communication method further includes a second information transmitting step of operating the wireless connection providing apparatus to transmit the information, which is transmitted from the wireless communication apparatus, to the database server. Connection between the wireless connection providing apparatus and the database server may be wired connection, may be wireless connection, or may be both of the wired connection and the wireless connection.

With such a configuration, it is possible to acquire and collect data needed by the database server from the wireless communication apparatus via the wireless connection providing apparatus.

In the present invention, it is also preferable that the wireless connection providing apparatus accumulates the information transmitted from the wireless communication apparatus and then collectively transmits the information to the database server at predetermined timing.

With this configuration, it is possible to transmit data from the wireless connection providing apparatus to the database server in a period of time when network traffic is light. This is effective, in particular, when the connection between the wireless connection providing apparatus and the database server is wireless connection because a communication band is limited.

In the present invention, it is also preferable that the wireless communication apparatus has a function of providing wireless connection, and the wireless communication apparatus includes the subscription information, which is included in the control frame received in the control-frame receiving step, in a control frame of the wireless connection provided by the wireless communication apparatus and then transmits the subscription information, receives the information needed by the subscription information from a second wireless communication apparatus, and then transmits the information to the wireless connection providing apparatus.

With such a configuration, it is possible to collect necessary information through a plurality of wireless connections. For example, it is conceivable to provide the wireless connection providing apparatus and the second wireless communication apparatus as fixedly-set apparatuses and provide the first wireless communication apparatus as a movable apparatus. In this case, the first wireless communication apparatus can collect information from the second wireless communication apparatus while moving and transmit the collected information to the wireless connection providing apparatus at a point when the first wireless communication apparatus is capable of communicating with the wireless connection providing apparatus.

In the present invention, as the subscription information, any form can be adopted as long as necessary data can be specified. For example, the subscription information may include attribute information representing an attribute of necessary information or may include attribute information representing an attribute of unnecessary information. The attribute information may be an identifier of information (a name or the like of the information) for specifying necessary or unnecessary information, may be a category of the information, or may be a generation place, generation time, and the like of the information. The attribute information may be represented in a text format such as a URI format or an XML format or may be represented as a hash value calculated from the attribute information. When a plurality of kinds of information are necessary (or unnecessary), a plurality of kinds of attribute information for specifying the plurality of kinds of information may be included in the subscription information. In that case, the plurality of kinds of attribute information may be enumerated in one kind of subscription information. Alternatively, an OR of hash values of the plurality of kinds of attribute information may be included in the subscription information (a bloom filter).

In the present invention, it is also preferable that, in the subscription-information acquiring step, the wireless connection providing apparatus acquires a plurality of kinds of subscription information different from one another, and, in the control-frame transmitting step, the wireless connection providing apparatus cyclically changes the subscription information included in the control frame. For example, in the wireless LAN, it is possible to transmit, using a technique of a virtual AP, a beacon in which an ESSID is cyclically changed.

With such a configuration, it is possible to deliver the plurality of kinds of subscription information.

In the present invention, it is also preferable that a public key of an information request source is included in the subscription information, and, in the information transmitting step, the wireless communication apparatus transmits the information after encrypting the information using the public key included in the subscription information.

Consequently, it is possible to conceal information to be transmitted and prevent apparatuses other than the information request source from reading the information.

Note that the present invention can also be grasped as a communication method for executing at least a part of the processing explained above. The present invention can also be grasped as a wireless communication system, a wireless connection providing apparatus, or a wireless communication apparatus including means for executing at least a part of the processing. The present invention can also be grasped as a computer program for causing a computer to execute the method or a computer-readable storage medium having the computer program non-transitorily stored therein. The present invention can be configured by combining the respective kinds of means and processing with one another as much as possible.

For example, according to a second aspect of the present invention, there is provided a wireless communication system configured from a wireless connection providing apparatus that provides wireless connection and a wireless communication apparatus capable of performing wireless communication with the wireless connection providing apparatus, wherein the wireless connection providing apparatus includes:
a subscription-information acquiring unit configured to acquire subscription information for specifying necessary information; and
a control-frame transmitting unit configured to include the subscription information in a control frame notifying surroundings of presence of the wireless connection providing apparatus and then transmit the subscription information, and the wireless communication apparatus includes:
a control-frame receiving unit configured to receive the control frame;
a determining unit configured to determine whether the wireless communication apparatus retains information, which is specified as being necessary by the subscription information included in the control frame; and
an information transmitting unit configured to, when determination is made by the determining unit that the wireless communication apparatus retains the information, establish connection to the wireless connection providing apparatus and then transmit the information.

According to a third aspect of the present invention, there is provided a wireless connection providing apparatus including:
a subscription-information acquiring unit configured to acquire subscription information for specifying necessary information; and
a control-frame transmitting unit configured to include the subscription information in a control frame notifying surroundings of presence of the apparatus itself and then transmitting the subscription information.

According to a fourth aspect of the present invention, there is provided a wireless communication apparatus including:
a control-frame receiving unit configured to receive, from a wireless connection providing apparatus that provides wireless connection, a control frame for notifying presence of the wireless connection providing apparatus, the control frame being configured to include subscription information for specifying necessary information;
a determining unit configured to determine whether the wireless communication apparatus retains information, which is specified as being necessary by the subscription information included in the control frame; and
an information transmitting unit configured to, when determination is made by the determining unit that the wireless communication apparatus retains the information, establish connection to the wireless connection providing apparatus and then transmit the information.

According to the present invention, in the wireless communication system in which the wireless communication apparatus selectively transmits necessary data, before establishing wireless connection, it is possible to determine whether the wireless communication apparatus retains the necessary data. Therefore, the wireless connection has to be established only when the wireless communication apparatus actually transmits data. It is possible to avoid useless connection.

DESCRIPTION OF EMBODIMENTS

First Embodiment

Overview

Figure 1A:
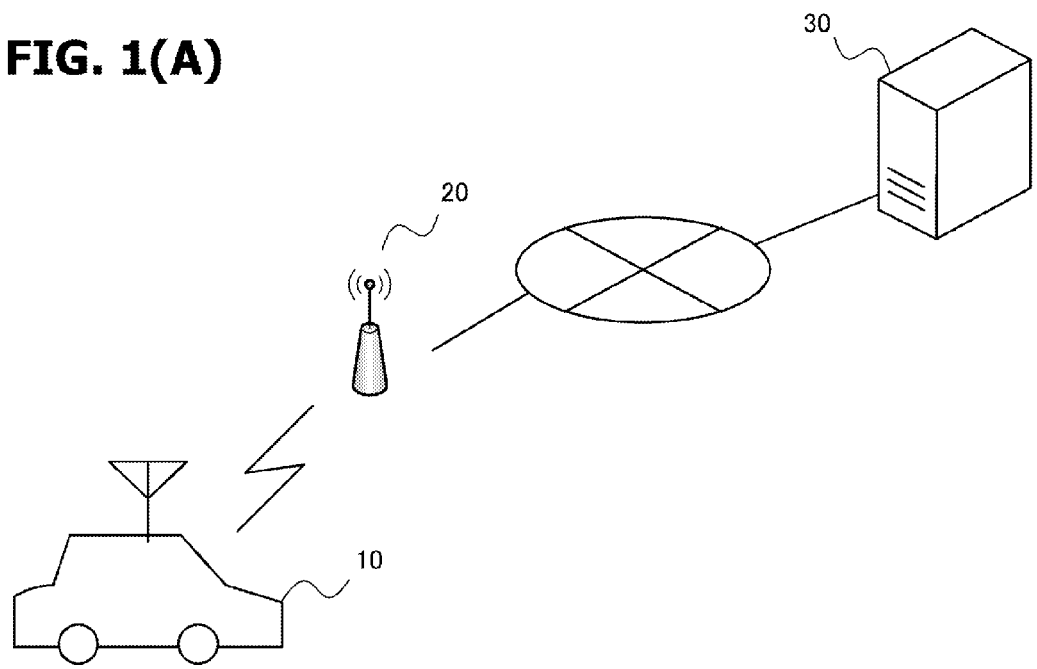
FIG. 1(A) is a diagram showing an overview of a wireless communication system according to a first embodiment.

FIG. 1(A) is a diagram showing an overview of a wireless communication system according to a first embodiment of the present invention. The wireless communication system is configured from a vehicle 10, a wireless base station 20, and a database server 30 and performs communication using a publisher/subscriber communication model. In this embodiment, it is assumed that the vehicle 10 is a publisher, the database server 30 is a subscriber, and information acquired by a sensor in the vehicle 10 is asynchronously transmitted to the database server 30. Note that, in FIG. 1(A), only one vehicle 10, one wireless base station 20, and one database server 30 are shown. However, the wireless communication system in this embodiment may include a plurality of these elements.

The vehicle 10 has a wireless communication function such as a wireless LAN and performs communication with the database server 30 via the wireless base station 20. The wireless base station 20 and the database server 30 perform communication through wired communication or wireless communication or both of the wired communication and the wireless communication. In the wireless communication system in this embodiment, a publisher/subscriber message service is realized using middleware for the publisher/subscriber message service (hereinafter referred to as Pub/Sub middleware or simply referred to as middleware). Specific implementation of the publisher/subscriber message service is not particularly limited. Any existing method can be used. For example, the publisher/subscriber message service can be realized by managing and delivering subscription information and publishing information on a P2P network or a CDN (content delivery network).

When desiring to acquire certain information, the database server 30 issues subscription information (Sub) for requesting the information. A method of specifying the information is not particularly limited. For example, the information can be specified by a name of the information, an identifier of the information, a category of the information, a generation place and generation time of the information, and the like. The subscription information issued from the database server 30 is circulated in the wireless communication system and transmitted to the wireless base station 20 and the vehicle 10.

When the vehicle 10 retains information needed by the database server 30, the vehicle 10 transmits the information to the wireless base station 20. In other words, when the vehicle 10 does not retain the information needed by the database server 30, the vehicle does not perform the transmission of the information. As explained above, it is described in the subscription information what kind of information the database server 30 needs. The subscription information is transmitted via the Pub/Sub middleware. The Pub/Sub middleware performs communication in a level of an application layer. Therefore, the vehicle 10 has to perform establishment of wireless connection to the wireless base station 20 (authentication, association, etc.) in order to acquire the subscription information from the wireless base station 20 via the Pub/Sub middleware. After the wireless connection to the wireless base station 20 is established and the subscription information is acquired, when it is determined that the vehicle 10 does not retain information requested in the subscription information, establishment processing for the wireless connection is wasted.

Figure 1B:
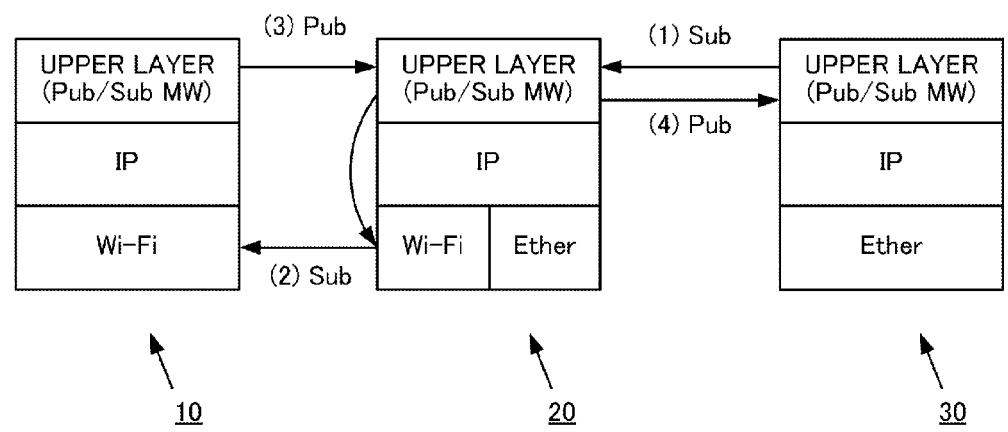
FIG. 1(B) is a diagram for explaining a transmission method for subscription information and publishing information in the wireless communication system according to the first embodiment.

Therefore, in this embodiment, it is an object to eliminate this problem by making it possible to determine before the establishment of the wireless connection whether the vehicle 10 retains the necessary information. A communication method in this embodiment is explained with reference to FIG. 1(B). Between the database server 30 and the wireless base station 20, the subscription information (and the publishing information) is exchanged in the application layer level via the Pub/Sub middleware. On the other hand, the subscription information is transmitted from the wireless base station 20 to the vehicle 10 in a level of a data link layer (a MAC layer). Specifically, the wireless base station 20 stores the subscription information in an ESSID field of a beacon frame for notifying the surroundings of the presence of an access point in a wireless LAN and transmits the subscription information. Consequently, before the vehicle 10 establishes wireless connection to the wireless base station 20, it is possible to determine whether the vehicle 10 retains the information requested by the subscription information, that is, whether the vehicle 10 needs to establish the wireless connection to the wireless base station 20. After the vehicle 10 establishes the wireless connection to the wireless base station 20, the vehicle 10 transmits the requested information in the application layer level as in the past.

Configurations

Figure 2A:
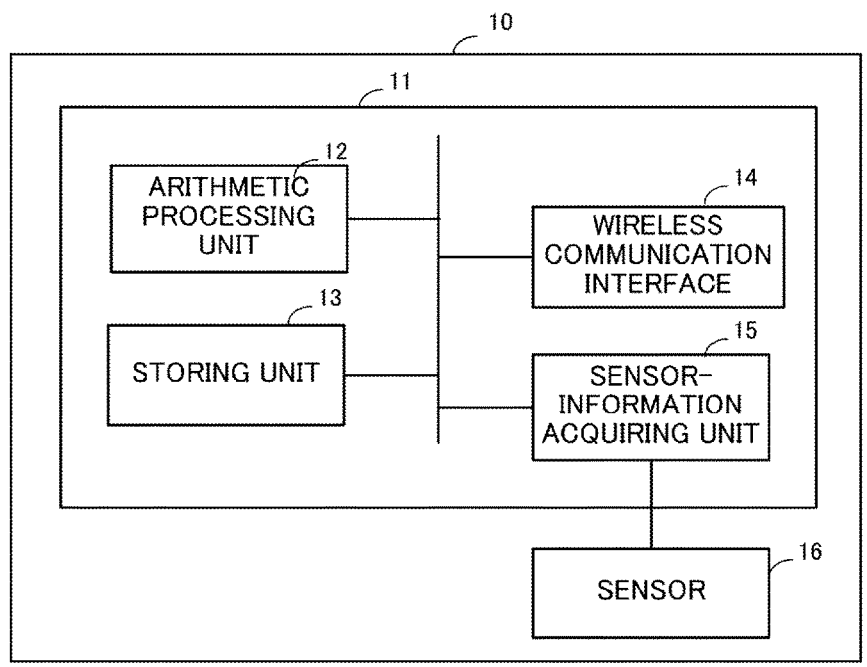
FIG. 2(A) is a diagram showing the hardware configuration of a vehicle-mounted terminal (a wireless communication apparatus) according to the first embodiment.

The configurations of the vehicle 10, the wireless base station 20, and the database server 30 are explained below. The hardware configuration of the vehicle 10 is shown in FIG. 2(A). The vehicle 10 includes a vehicle-mounted terminal 11 configured from an arithmetic processing unit 12 configured from a microprocessor unit (MPU) or the like, a storing unit 13 configured from a RAM, a ROM, or the like, a wireless communication interface 14 for performing wireless communication with the wireless base station 20, a sensor-information acquiring unit 15 that acquires sensor information from a sensor 16 in the vehicle. The wireless communication interface 14 adopts, in this embodiment, a wireless LAN (IEEE 802.11 series) as a communication system. The vehicle 10 functions as a wireless LAN client. The sensor 16 may be any sensor. The sensor 16 acquires information such as position information, speed information, ON/OFF of a wiper, battery information, power supply information, air pressure of tires, and biological information of a driver. The sensor 16 does not need to be a sensor installed in the vehicle 10 and may be a device owned by the driver such as a wearable terminal, a portable terminal, or the like.

Figure 2B:
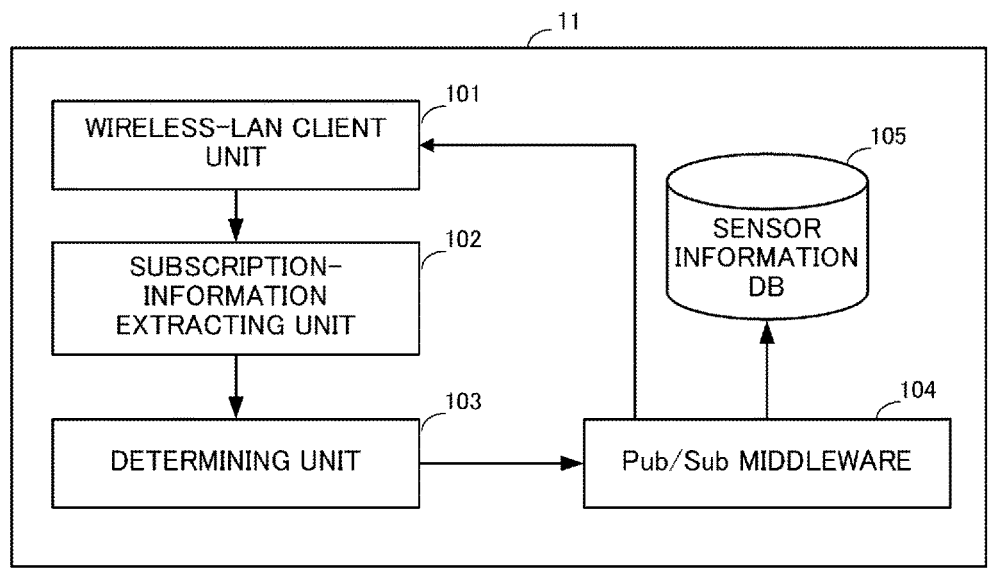
FIG. 2(B) is a diagram showing the functional configuration of the vehicle-mounted terminal according to the first embodiment.

The arithmetic processing unit 12 realizes functional units shown in FIG. 2(B) by executing a computer program stored in the storing unit 13. That is, the vehicle-mounted terminal 11 provides functional units such as a wireless-LAN client unit 101, a subscription-information extracting unit 102, a determining unit 103, Pub/Sub middleware 104, and a sensor-information storing unit 105. A part or all of the functional units may be realized by dedicated hardware circuits. Note that the vehicle-mounted terminal 11 is equivalent to a wireless communication apparatus capable of performing wireless communication with the wireless base station 20 (a wireless connection providing apparatus).

The wireless-LAN client unit 101 is a functional unit that performs communication conforming to a wireless LAN standard with the wireless base station 20 via the wireless communication interface 14. Specifically, the wireless-LAN client unit 101 performs establishment of wireless connection, access control, and the like.

The subscription-information extracting unit 102 is a functional unit that extracts subscription information from a beacon frame (a management frame) received by the wireless-LAN client unit 101. In this embodiment, the wireless-LAN client unit 101 receives the beacon frame through passive scan. As explained below, in this embodiment, an ESSID in the beacon frame is the subscription information. Therefore, the subscription-information extracting unit 102 extracts the ESSID as the subscription information.

The determining unit 103 is a functional unit that determines whether the vehicle 10 retains information requested to be transmitted in the subscription information extracted by the subscription-information extracting unit 102. When determining that the vehicle 10 retains the information, the determining unit 103 controls the wireless-LAN client unit 101 to start wireless connection establishment processing with the wireless base station 20. The determination concerning whether the vehicle 10 retains the information specified by the subscription information may be assigned to the Pub/Sub middleware 104.

The Pub/Sub middleware 104 is middleware for realizing a publisher/subscriber message service in the wireless communication system according to this embodiment. For example, the Pub/Sub middleware 104 performs processing such as acquisition, management, and relay of the subscription information, management of sensor information acquired from the sensor-information acquiring unit 15, and transmission, management, and relay of the publishing information.

In the sensor-information storing unit 105, sensor information acquired from the sensor 16 by the sensor-information acquiring unit 15 is stored. In the sensor-in-formation storing unit 105, for example, time and a place (latitude and longitude information, an area ID, and the like) of the acquisition of the sensor information are stored in association with the sensor information.

Details of the processing by the functional units of the vehicle-mounted terminal 11 are explained in detail below with reference to FIG. 4 and subsequent figures.

Figure 3A:
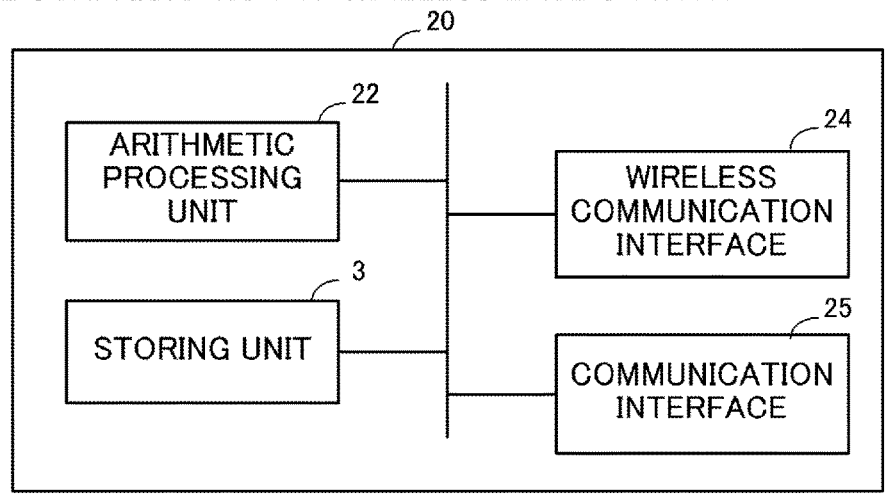
FIG. 3(A) is a diagram showing the hardware configuration of a wireless base station (a wireless connection providing apparatus) according to the first embodiment.

The hardware configuration of the wireless base station 20 is shown in FIG. 3(A). The wireless base station 20 includes an arithmetic processing unit 22 configured from a microprocessor unit (MPU) or the like, a storing unit 23 configured from a RAM, a ROM, or the like, a wireless communication interface 24 for performing wireless communication with the vehicle 10, and a communication interface 25 for performing communication with the database server 30. The wireless communication interface 24 adopts, in this embodiment, a wireless LAN (IEEE 802.11 series) as a communication system. The wireless base station 20 functions as a wireless LAN access point and performs provision of wireless connection to the vehicle 10. The communication interface 25 adopts, for example, an Ethernet (registered trademark) as a communication system. Note that the wireless base station 20 is equivalent to a wireless connection providing apparatus that provides the vehicle-mounted terminal 11 (the wireless communication apparatus) with the wireless connection.

Figure 3B:
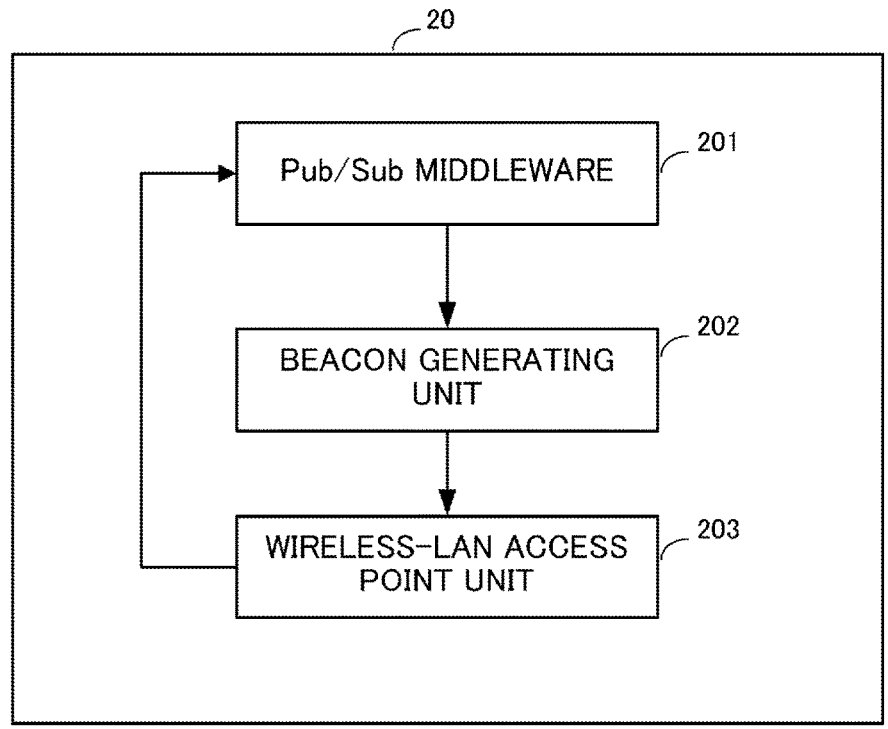
FIG. 3(B) is a diagram showing the functional configuration of the wireless base station according to the first embodiment.

The arithmetic processing unit 22 realizes the functional units shown in FIG. 3(B) by executing a computer program stored in the storing unit 23. That is, the wireless base station 20 provides functional units such as Pub/Sub middleware 201, a beacon generating unit 202, and a wireless-LAN access point unit 203. A part or all of the functional units may be realized by dedicated hardware circuits.

The Pub/Sub middleware 201 is middleware for realizing a publisher/subscriber message service in the wireless communication system according to this embodiment. The Pub/Sub middleware 201 performs processing such as acquisition and relay of subscription information and transmission, storage, and relay of publishing information.

The beacon generating unit 202 is a functional unit that acquires necessary subscription information from the Pub/Sub middleware 201 and generates a beacon frame (a management frame) of a wireless LAN access point including the subscription information. Specifically, the beacon generating unit 202 generates a beacon frame in which the subscription information is included in an ESSID field. Specific processing for storing the subscription information in the beacon frame is explained below.

The wireless-LAN access point unit 203 is a functional unit that provides the vehicle-mounted terminal 11 with wireless connection by a wireless LAN as a wireless LAN access point. Specifically, the wireless-LAN access point unit 203 carries out wireless connection processing including transmission and authentication/association processing of a beacon frame and processing such as routing of received information.

The database server 30 is a normal computer including a communication interface and executes Pub/Sub middleware. The database server 30 transmits subscription information, which specifies an attribute of necessary information, via the Pub/Sub middleware and acquires information (publishing information) matching the subscription information.

Processing

Figure 4:
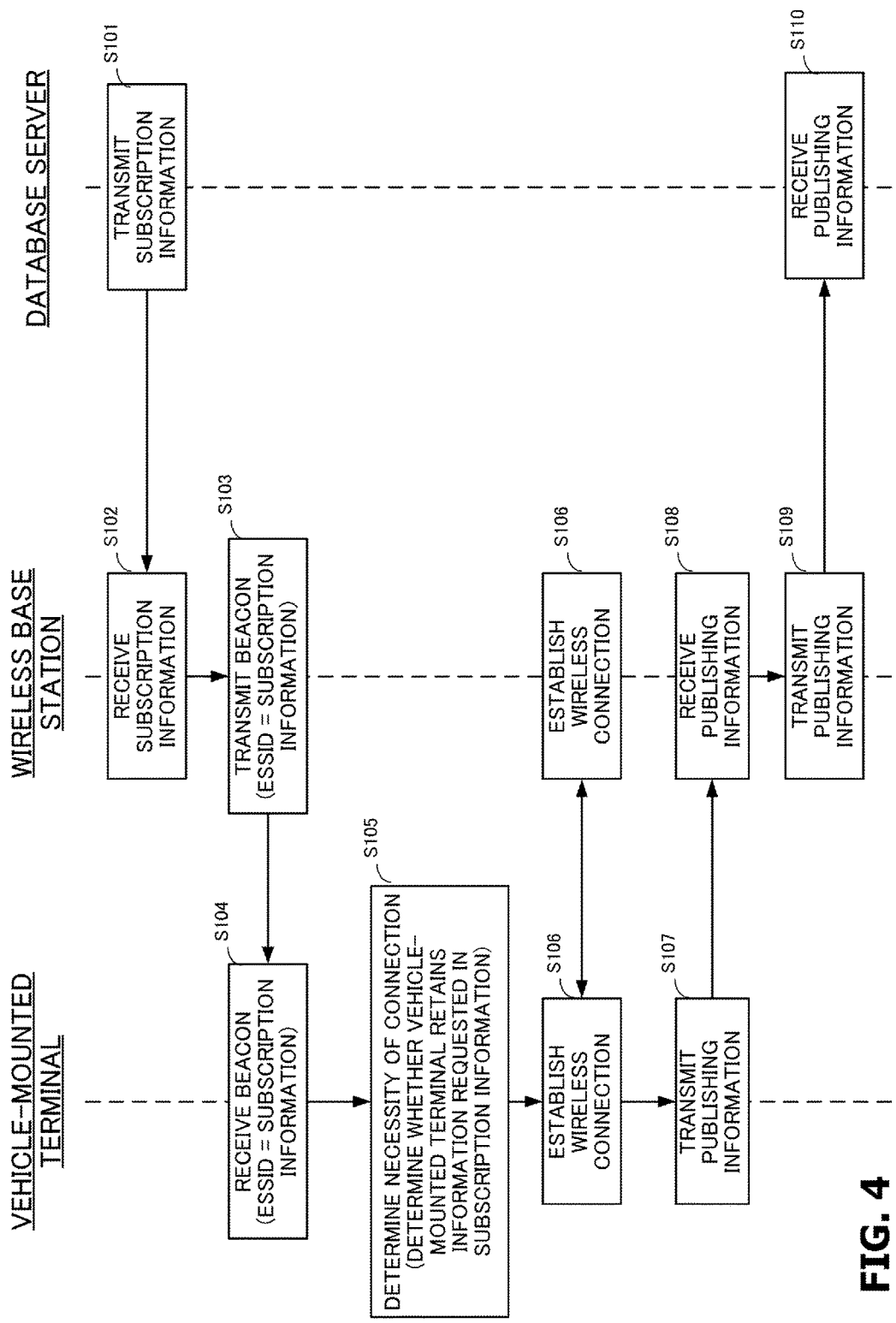
FIG. 4 is a diagram for explaining a flow of a communication method in the first embodiment.

The communication processing in the wireless communication system according to this embodiment is explained more in detail with reference to FIG. 4 and FIG. 5. FIG. 4 is a diagram showing an example of a flow of the communication processing in this embodiment. FIG. 5 is a diagram showing data formats of subscription information and publishing information.

First, the database server 30 generates subscription information, which specifies necessary information, via the Pub/Sub middleware (S101). A specific transmission method is different depending on adopted middleware. For example, it is conceivable to transmit the subscription information by multicast.

Figure 5A:
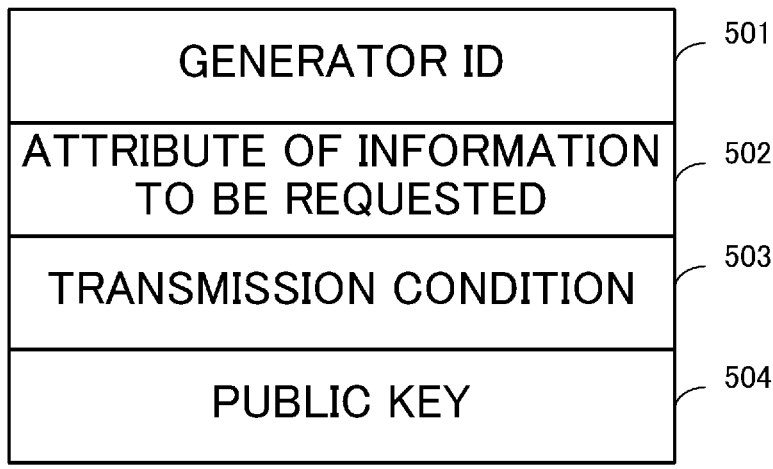
FIG. 5(A) is a diagram showing a data format of the subscription information.

A format of the subscription information is shown in FIG. 5(A). The subscription information includes a generator ID 501, an attribute of information to be requested (hereinafter referred to as attribute information) 502, a transmission condition 503, and a public key 504.

The generator ID 501 is an identifier for specifying a generator who generates the subscription information. As the generator ID 501, it is conceivable to adopt, for example, an identifier of an application program that generates the subscription information, an identifier of middleware, an IP address or a MAC address of the generator, or the like.

The attribute information 502 is information for specifying necessary information (requested information). For example, when a particular name or identifier is allocated to information, the name or identifier of necessary information can be adopted as attribute information. Alternatively, a type of information or a genre or a category to which the information belongs can be adopted as the attribute information. A classifying method for information may be any method. For example, as the type of information, speed information of a vehicle, position information of the vehicle, ON/OFF information of a wiper in the vehicle, or the like can be adopted. As the genre or the category of information, an image or a moving image, information concerning sports, information concerning economy, or the like can also be adopted. As the attribute information, a generation place, a generator, generation time, or the like of information can also be adopted. As the attribute information, attribute information of any format can be adopted as long as the necessary information can be specified.

A character string format can be adopted as a specific representation format of the attribute information 502. For example, it is conceivable to adopt a text format such as a URI (Universal Resource Identifier) format or an XML (Extensible Markup Language) format.

(1) /itc/movie/_v1/_c2/

(2) /itc/lon35.685456/lat139.753878/time1353252/

(1) is an example representing an identifier of information. (2) is an example representing a generation place and generation time of the information. In (2), only one point (a set of latitude and longitude) is shown as the generation place. However, for example, two points may be designated to specify a rectangular region. One point and a radius may be designated to specify a circular region. The attribute information 502 may be represented in an XML format. For example, it is conceivable to adopt representations shown below.

(3) <sub DataType=Speed>
(4) <sub Source=A Genre=Sports>

(3) is an example representing a genre (a type) of the information. (4) is an example representing a generator and a genre of the information.

Note that the attribute information 502 may be attribute information representing an attribute of information needed by a subscriber or may be attribute information representing an attribute of information not needed by the subscriber. When unnecessary information is specified, information other than the specified information is necessary. Therefore, the attribute information 502 can be treated in the same manner as when necessary information is specified in the attribute information 502. Note that a flag representing whether the attribute information 502 represents the attribute of the necessary information or represents the attribute of the unnecessary information can also be adopted.

The transmission condition 503 designates a transmission condition for subscription information and publishing information, which is a reply to the subscription information. For example, when the subscription information or the publishing information is transmitted, time, a geography, a network topology, a node attribute (residual power or mobility), or the like can be designated as the transmission condition.

The public key 504 is a public key of a subscriber information generator (an information request source). When the public key is transmitted together with the subscription information, the publisher can encrypt the publishing information with the public key and transmit the publishing information.

In the subscriber information, the attribute information 502 only has to be included and the transmission condition 503 and the public key 504 do not have to be included.

The Pub/Sub middleware 201 of the wireless base station 20 receives the subscription information from the database server 30 (S102). Then, the beacon generating unit 202 generates a beacon frame including the subscription information as an ESSID and periodically transmits the beacon frame (S103).

In an ESSID field in the beacon frame of the wireless LAN, any data of 32 octets (256 bits) can be included. Therefore, the subscription information (or information corresponding to the subscription information) is stored in the ESSID field. The subscription information is transmitted from the wireless base station 20 to the vehicle-mounted terminal 11 using the beacon frame.

The beacon generating unit 202 only has to include, in a beacon, at least the attribute information 502 in the subscription information. This is because, if the attribute information 502 is present, it is possible to determine whether the vehicle-mounted terminal 11 retains information requested by the subscription information. The other information in the subscription information only has to be acquired after the vehicle-mounted terminal 11 establishes wireless connection to the wireless base station 20. Since the ESSID in the wireless LAN has only 32 octets, it is important to reduce an information amount included in the beacon.

The beacon generating unit 202 may directly use, as the ESSID, the attribute information 502 represented by text information. However, in that case, attribute information equal to or larger than 32 characters cannot be stored. Therefore, a hash value (32 octets) of the attribute information 502 may be calculated and used as the ESSID. Note that the attribute information 502 in the subscription information transmitted by the database server 30 may be represented by a hash value.

The wireless-LAN client unit 101 of the vehicle-mounted terminal 11 receives the beacon frame transmitted from the wireless base station 20 (S104). When the beacon frame is received, the subscription-information extracting unit 102 extracts the subscription information (more accurately, the attribute information) from the ESSID of the beacon frame and passes the extracted subscription information to the determining unit 103. The determining unit 103 determines whether the vehicle-mounted terminal 11 retains information specified as necessary in the subscription information (S105). For example, when a generation place or generation time of information is designated as the attribute information, the determining unit 103 determines whether sensor information acquired in the designated place or at the designated time is stored in the sensor-information storing unit 105. Even when requested information is information other than the sensor information, similarly, the determining unit 103 only has to determine whether the vehicle-mounted terminal 11 retains information including the attribute information. Note that, as a result of the determination in step S105, when the vehicle-mounted terminal 11 retains the information requested in the subscription information, the vehicle-mounted terminal 11 starts wireless connection to the wireless base station 20. Therefore, step S105 can also be considered processing for determining necessity of wireless connection to the wireless base station 20.

When it is determined in step S105 that the vehicle-mounted terminal 11 retains the information requested in the subscription information, the vehicle-mounted terminal 11 establishes wireless connection to the wireless base station 20 (S106). Specifically, the vehicle-mounted terminal 11 carries out, between the wireless base station 20 and the vehicle-mounted terminal 11, authentication processing or association processing specified in the wireless LAN or, if necessary, for example, allocation processing for an IP address according to necessity.

When the wireless connection between the vehicle-mounted terminal 11 and the wireless base station 20 is established, the Pub/Sub middleware 104 of the vehicle-mounted terminal 11 transmits the information requested by the subscription information to the wireless base station 20 as publishing information. Note that, after the establishment of the wireless connection, the Pub/Sub middleware 201 preferably acquires the subscription information from the wireless base station 20 again through a regular route. This is because, in notification via a beacon, in some case, only a part of the subscription information can be transmitted.

Figure 5B:
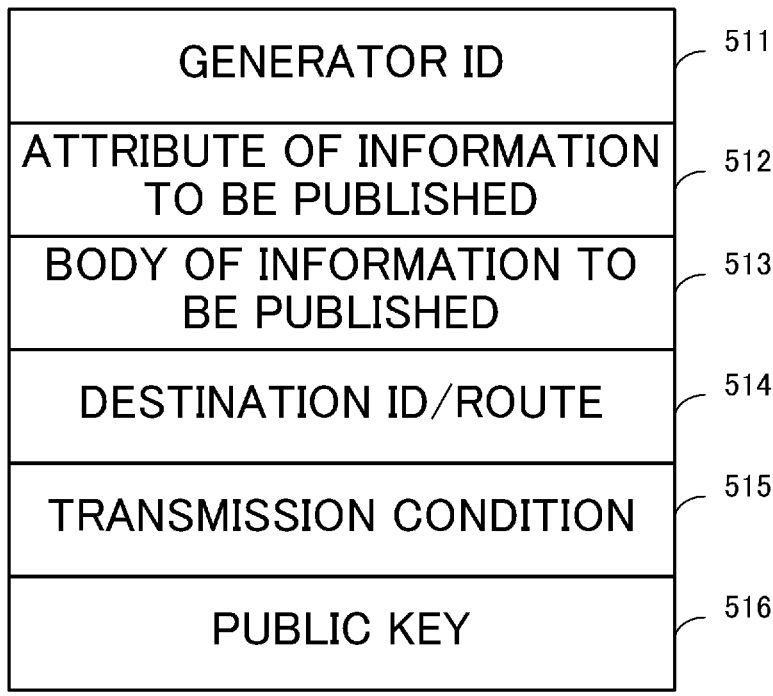
FIG. 5(B) is a diagram showing a data format of the publishing information.

A format of the publishing information is shown in FIG. 5(B). The publishing information includes a generator ID 511, an attribute 512 of information to be published, a body 513 of the information to be published, a destination ID/route 514, a transmission condition 515, and a public key 516.

The generator ID 511 is an identifier for specifying a generator who generates the publishing information. As the generator ID 511, like the generator ID 501, it is conceivable to adopt an identifier of an application program that generates the subscription information, an identifier of middleware, an IP address or a MAC address of the generator, or the like.

The attribute 512 of the information to be published is basically the same as the attribute information 502. A URI format, an XML format, or a format such as a hash value can be adopted.

The body 513 of the information to be published is information corresponding to the information requested by the subscription information. For example, sensor information generated in a predetermined place or at predetermined time corresponds to the information body 513. In the information body 513, the publishing information may be included as a plain text. When the public key 504 is included in the subscription information, it is preferable to encrypt the publishing information with the public key 504 and return the publishing information. Consequently, it is possible to conceal the publishing information from people other than the subscription information generator.

The destination ID/route 514 is data for designating a destination and a route of the publishing information. A destination ID and a route can be specified on the basis of a propagation route of the subscription information. Therefore, it is possible to make transmission of the publishing information efficient by including these kinds of information in the publishing information.

The transmission condition 515 designates a condition for transmitting the publishing information like the transmission condition 503 in the subscription information.

The public key 516 is a public key of the publishing information generator. By including the public key of the generator in the publishing information, when a receiver of the publishing information transmits data to the publishing information generator, it is possible to perform concealment of data.

The publishing information transmitted from the vehicle-mounted terminal 11 is received by the wireless base station 20 (S108). The wireless base station 20 transmits the publishing information to the database server 30 (S109). Consequently, the database server 30 can receive necessary information (S110).

Advantageous Effects of this Embodiment

According to this embodiment, the subscription information is included in the beacon frame of the wireless LAN access point and transmitted. Therefore, the vehicle-mounted terminal 11 can determined, simply by receiving the beacon frame, whether the vehicle-mounted terminal 11 owns information corresponding to the subscription information. That is, the vehicle-mounted terminal 11 does not have to perform wireless connection to the wireless base station 20 and acquire the subscription information according to an upper layer protocol. When the vehicle-mounted terminal 11 does not retain information corresponding to the subscription information, it is possible to omit the establishment processing for wireless connection. This is effective because useless processing can be omitted in the vehicle-mounted terminal 11. It is possible to realize efficient communication because useless connection is not established in the wireless base station 20 either.

Second Embodiment

In the first embodiment, the vehicle 10 (the vehicle-mounted terminal 11) is a communication node at a terminal end. In this embodiment, the vehicle-mounted terminal 11 further has a function of a wireless base station (a wireless LAN access point) and performs delivery of subscription information like the wireless base station 20. That is, a configuration is adopted in which, the vehicle-mounted terminal 11 transmits a beacon frame in which the subscription information is stored and acquires publishing information from a sensor node (a second wireless communication apparatus) set in a structure or the like on a road side.

Figure 6A:
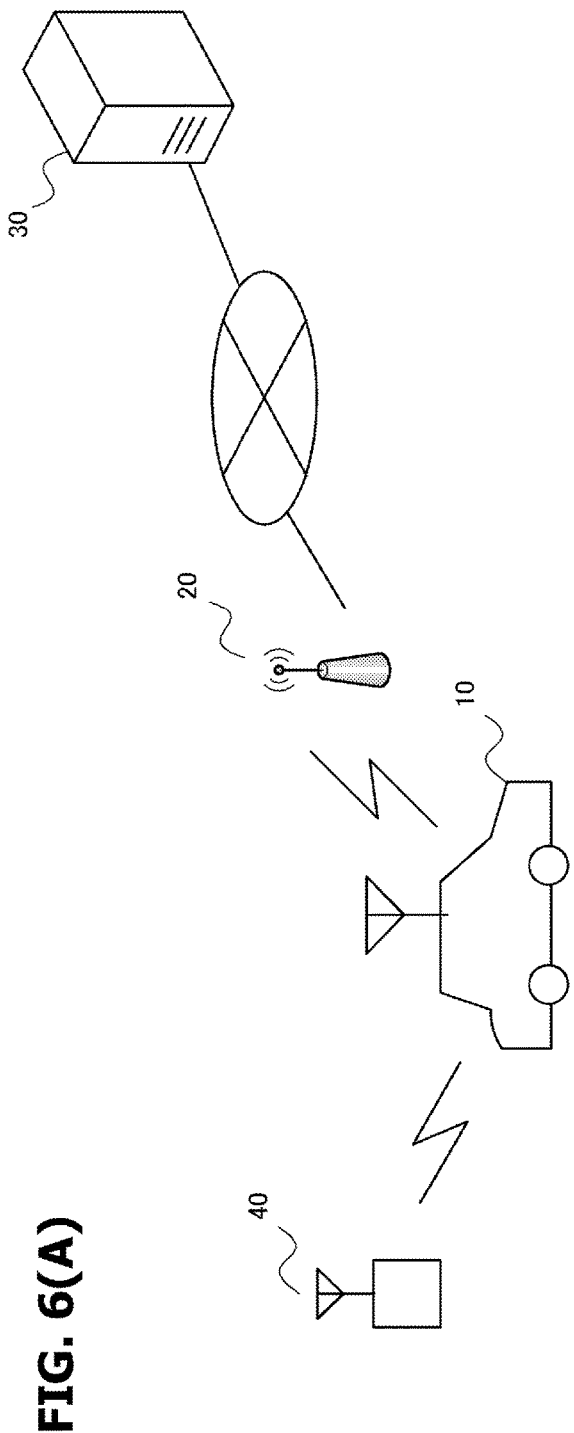
FIG. 6(A) is a diagram showing an overview of a wireless communication system according to a second embodiment.

The configuration of a wireless communication system according to this embodiment is shown in FIG. 6(A). The wireless communication system according to this embodiment is configured from the vehicle 10, the wireless base station 20, the database server 30, and a sensor node 40. The configurations of the database server 30 and the wireless base station 20 are the same as the configurations in the first embodiment.

In this embodiment, the vehicle 10 (the vehicle-mounted terminal 11) includes, besides a wireless communication interface for communicating with the wireless base station 20 as a wireless LAN client, a wireless communication interface for communicating with the sensor node 40 as a wireless LAN access point. Like the wireless base station 20, the vehicle 10 stores the subscription information in an ESSID field of a wireless LAN and transmits a beacon frame.

Note that the vehicle 10 may include only one wireless communication interface supporting a Wi-Fi direct and communicate with both of the wireless base station 20 and the sensor node 40 through the wireless communication interface.

The sensor node 40 is, for example, a node having a function of collecting sensor information and transmitting the collected sensor information. The sensor node 40 is, for example, a stationary sensor node that is set in a bridge, a tunnel, or the like and periodically detects vibration, stress, and the like. The sensor node 40 has a configuration same as the vehicle-mounted terminal in the first embodiment and determines whether the sensor node 40 retains information requested in the subscription information included in the beacon transmitted from the vehicle-mounted terminal 11. When determining that the sensor node 40 retains the information requested by the subscription information, the sensor node 40 establishes wireless connection with the vehicle-mounted terminal 11 and transmits the sensor information as publishing information.

Figure 6B:
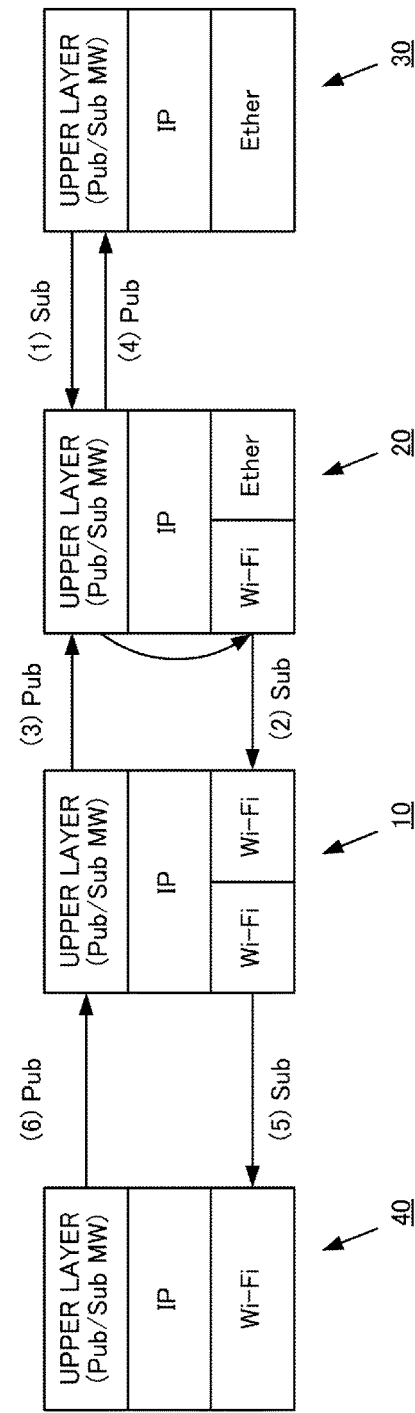
FIG. 6(B) is a diagram for explaining a transmission method for subscription information and publishing information in the wireless communication system according to the second embodiment.

FIG. 6(B) is a diagram showing an example of a communication method in this embodiment. Processing for storing the subscription information transmitted from the database server 30 in a beacon frame of a wireless LAN and transmitting the subscription information from the wireless base station 20 to the vehicle-mounted terminal 11 is the same as the processing in the first embodiment.

When the vehicle-mounted terminal 11 does not retain the information requested in the subscription information, the vehicle-mounted terminal 11 does not establish connection with the wireless base station 20 and stores the subscription information in an ESSID of a beacon frame to be transmitted by the vehicle-mounted terminal 11 and transmits the subscription information. The following communication processing between the vehicle-mounted terminal 11 and the sensor node 40 is the same as the communication processing between the wireless base station 20 and the vehicle-mounted terminal 11 in the first embodiment. After the vehicle-mounted terminal 11 receives the publishing information from the sensor node 40, when the vehicle-mounted terminal 11 receives the beacon frame of the wireless base station 20, the vehicle-mounted terminal 11 retains the information requested by the subscription information included in the beacon. Therefore, the vehicle-mounted terminal 11 establishes wireless connection to the wireless base station 20 and transmits the information.

When the vehicle-mounted terminal 11 retains the information requested in the subscription information, the vehicle-mounted terminal 11 establishes wireless connection to the wireless base station 20 and transmits the information. At this point, the vehicle-mounted terminal 11 may store the received subscription information in a beacon frame and transmit the subscription information or may not transmit the subscription information. If the information requested by the subscription information is only the information retained by the vehicle-mounted terminal 11, further collection of information is unnecessary. Therefore, further delivery of the subscription information is unnecessary. Otherwise, redelivery of the subscription information is preferable.

In this embodiment, effects same as the effects in the first embodiment are obtained. Further, the vehicle 10 is capable of collecting, by moving, information even from a place where an infrastructure for wireless communication is not arranged. In the sensor node, in general, operation with a small battery capacity and low power consumption is requested. According to this embodiment, establishment of unnecessary wireless connection can be omitted. Therefore, it is possible to reduce power consumption in the sensor node.

Note that, in this embodiment, it is explained that the vehicle-mounted terminal 11 collects information from the sensor node 40, which is the stationary terminal. However, the vehicle-mounted terminal 11 may collect information from a mobile terminal (e.g., other vehicle-mounted terminal).

If information is collected only from stationary terminals and setting places of the stationary terminals are known in advance, the vehicle-mounted terminal 11 may transmit the beacon frame including the subscription information only in the setting places of the stationary terminals.

Modifications

In the above explanation, the present invention is illustratively explained. Various modifications of the present invention are possible within the scope of the technical idea of the present invention. For example, it is conceivable to adopt modifications explained below.

In the above explanation, only one kind of subscription information is stored in the beacon frame. However, when a plurality of kinds of subscription information are acquired from the database server 30, the plurality of kinds of subscription information may be included in the beacon frame. By including the plurality of kinds of subscription information in the beacon frame, it is possible to collect a plurality of kinds of information from the vehicle-mounted terminal 11. In this case, a method of listing (enumerating) and storing the plurality of kinds of subscription information in an EESID is conceivable. However, when the plurality of kinds of subscription information is simply enumerated, not all the kinds of subscription information sometimes can be stored because of limitation of an ESSID field. Therefore, it is sufficient to calculate an OR for each bit of hash values of the plurality of kinds of subscription information and store a result of the calculation in the ESSID field. That is, the hash values of the plurality of kinds of subscription information only have to be represented using a bloom filter. By using the bloom filter, it is possible to represent the subscription information with a small capacity.

When a bloom filter created from attribute information of a plurality of kinds of necessary information is used, the vehicle-mounted terminal 11 can discriminate whether information retained by the vehicle-mounted terminal 11 is likely to be necessary. More specifically, when a hash value of attribute information of information retained by the vehicle-mounted terminal 11 coincides with the bloom filter (does not change when an AND of the hash value and the bloom filter is calculated), it is seen that the information is likely to be necessary. When the hash value does not coincide with the bloom filter, it is seen that the information is surely unnecessary. In the bloom filter, false positivity (in this example, determining unnecessary information as necessary) is likely to occur. However, false negativity (in this example, determining necessary information as unnecessary) does not occur. Therefore, by using the subscription information in which the attribute information of the plurality of kinds of necessary information is represented by the bloom filter, although an unnecessary connection may be established due to the false positivity, it is possible to avoid a situation in which necessary information is not transmitted.

On the other hand, when the bloom filter created from attribute information of a plurality of kinds of unnecessary information is used, the vehicle-mounted terminal 11 can discriminate whether the information retained by the vehicle-mounted terminal 11 is likely to be unnecessary. More specifically, when a hash value of attribute information of the information retained by the vehicle-mounted terminal 11 itself coincides with the bloom filter, it is seen that the information is likely to be unnecessary. When the hash value does not coincide with the bloom filter, it is seen that the information is surely necessary. In this example, necessary information may be determined as unnecessary (false positivity; note that positivity indicates information is erroneously judged as unnecessary since the attribute information represents unnecessary information) and is not transmitted. However, unnecessary information is not determined as necessary by mistake (false negativity). That is, by using the subscription information in which the attribute information of the plurality of kinds of unnecessary information is represented by the bloom filter, although necessary information may not be transmitted because of the false positivity, it is possible to avoid a situation in which wireless connection is established when the vehicle-mounted terminal does not own necessary information.

Figure 7:
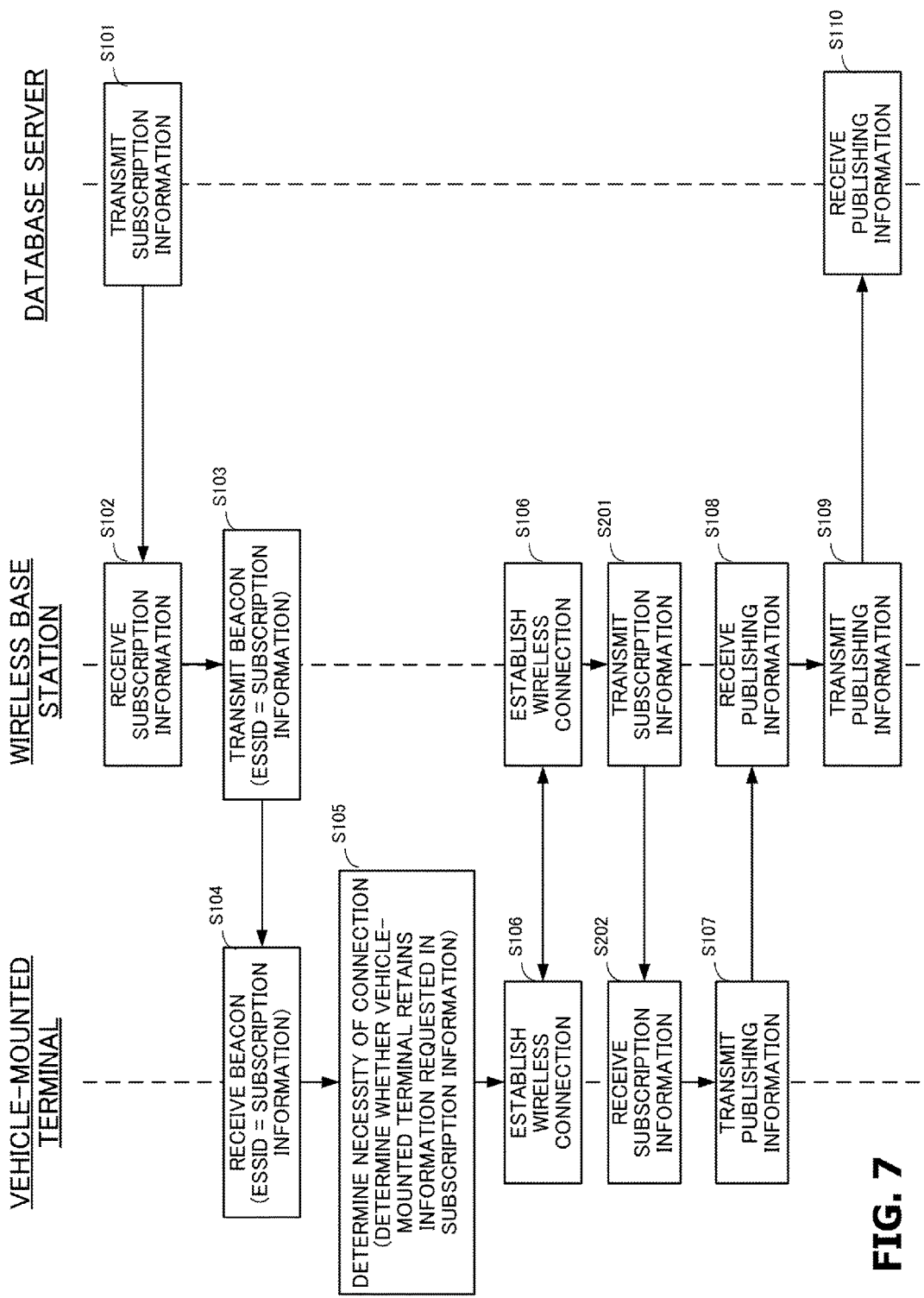
FIG. 7 is a diagram for explaining a flow of a communication method in a modification.

In the above explanation of the embodiment, necessity of transmission of the publishing information is determined on the basis of the subscription information included in the beacon frame and, if the transmission is necessary, the publishing information is transmitted. However, it is also preferable to transmit the subscription information from the wireless base station 20 to the vehicle 10 using an upper layer protocol after the vehicle 10 establishes wireless connection to the wireless base station 20. An example of a flow of communication processing in this modification is shown in FIG. 7. Compared with the first embodiment (FIG. 4), the communication processing is different in that, after the vehicle 10 and the wireless base station 20 establish the wireless connection in step S106, processing is added in which the wireless base station 20 transmits subscription information using the upper layer protocol (step S201) and the vehicle 10 receives the subscription information (step S202). The vehicle 10 transmits publishing information after reconfirming, on the basis of the received subscription information, information necessary to be transmitted.

In the transmission of the subscription information via the beacon frame, in some case, since only a part of attributes concerning necessary information or unnecessary information can be transmitted, simplified subscription information is transmitted. Therefore, by retransmitting complete subscription information using the upper layer protocol after establishing the wireless connection, it is possible to more accurately specify necessary or unnecessary information. When a plurality of kinds of information are collectively transmitted through the bloom filter as explained above, by acquiring subscription information again, it is possible to appropriately specify necessary information.

The wireless base station 20 may store a plurality of kinds of subscription information in different beacon frames and transmit the subscription information. In a wireless LAN, there is a function for enabling one access point to behave as an imaginary plurality of access points having different ESSIDs (imaginary access points). Therefore, by cyclically changing the ESSIDs of the beacon frames and obtaining subscription information, in which respective ESSIDs are different, using this function, the wireless base station 20 can distribute a plurality of kinds of subscription information. When subscription information is large and cannot be stored in one beacon frame, one kind of subscription information may be dividedly stored in a plurality of beacon frames and transmitted.

In the above explanation, a service realized on an IP protocol is used as the publisher/subscriber message service. However, in recent years, research and development of an information-oriented network called new generation network or future Internet have been conducted. It is examined that, in the new generation network, messaging processing is performed by a protocol system called information centric networking (ICN) without using the IP protocol. The ICN protocol is not decided at the present point. However, the communication method according to the present invention is applicable to a communication system that performs Pub/Sub messaging on any communication protocol other than the IP protocol. As an example of research concerning a Pub/Sub system on the ICN network, there is a document described below.

Jianchen, Jiachen, et al. "Copss: An efficient content oriented publish/subscribe system." Architectures for Networking and Communications Systems (ANCS), 2011 Seventh ACM/IEEE Symposium on. IEEE, 2011.

The present invention is also applicable to such a Pub/Sub messaging service.

In the above explanation, the communication system based on the publisher/subscriber message service is explained as the example. However, in the present invention, the publisher-subscriber message service does not have to be used. That is, the present invention can also be carried out as a wireless communication system in which a wireless LAN access point includes a transmission request for requesting specific information (equivalent to subscription information) in a beacon frame and transmits the transmission request. In general, the transmission request is transmitted in an upper layer such as an application layer. However, by notifying the transmission request in a level of a data link layer, it is possible to determine, without establishing wireless connection, whether requested information is retained. This effect can be attained irrespective of how the transmission request and the subscription information are distributed.

In the example explained above, the subscription information is stored in the ESSID field of the wireless LAN beacon frame and transmitted. However, the subscription information may be stored in a field other than the EESID and transmitted. For example, when connection between the wireless base station 20 and the vehicle-mounted terminal 11 is established conforming to the Hotspot 2.0 standard, it is possible to include the subscription information in a payload of an Operator Friendly Name element in an ANQP Response. In the Hotspot 2.0, before wireless connection establishment, a procedure is performed in which a wireless base station transmits a beacon, a wireless communication apparatus on a connection side transmits a query (a request) in response to the beacon, and the wireless base station returns a response. As one of the response transmitted from the wireless base station, there is an Operator Friendly name element of 256 octets that can be optionally set. By storing the subscription information in the element, it is possible to obtain effects same as the effects explained above.

In the above explanation, the wireless connection system between the wireless base station 20 and the vehicle-mounted terminal 11 is the wireless LAN. However, the wireless connection system is not limited to the wireless LAN and may be, for example, a Bluetooth™, a Zigbee™, a cellular, a WiMax™, and the like. In these wireless communication systems, a control frame is transmitted from a base station that provides wireless connection. Any data can be stored in the control frame. Therefore, when subscription information is included in the control frame transmitted from the base station, the wireless communication apparatus can start the wireless connection with the base station only when the wireless communication apparatus retains information requested in the subscription information.

For example, data of 37 octets can be stored in a payload of advertise data (Advertising Channel PDU) of Blutooth Low Energy. By storing the subscription information in the payload, it is possible to transmit the subscription information. The present invention is applicable to an apparatus corresponding to iBeacon (registered trademark) that adopts Bluetooth LE.

In the above explanation, it is assumed that, immediately after receiving publishing information, the wireless base station 20 transmits the information to the database server 30. However, this is not always necessary. The publishing information received in the wireless base station 20 may be accumulated and collectively transmitted to the database server 30 at predetermined timing. For example, when the wireless base station 20 and the database server 30 are connected by wireless communication, the publishing information is transmitted from the wireless base station 20 to the database server 30 in a period of time when a communication amount is small such as at night. Consequently, it is possible to avoid concentration of traffic. When a charge corresponding to a communication amount is imposed on communication between the wireless base station 20 and the database server 30, it is possible to save a communication charge by collectively transmitting the publishing information in a period of time when the communication charge is low.

When the wireless base station 20 retains a plurality of kinds of subscription information and does not afford to deliver all of the kinds of subscription information, the wireless base station 20 may select, according to any criterion, the subscription information to be included in a beacon and transmitted. For example, the wireless base station 20 may change, according to a place where the wireless base station 20 itself is set or moving speed of the vehicle 10 around the wireless base station 20, the subscription information to be included in the beacon frame. For example, when the wireless base station 20 is set on a road side and in a period of time when a flow of traffic is smooth, it is conceivable to include, in the beacon, subscription information for requesting data with a small size. This is because time when the vehicle 10 and the wireless base station 20 can communicate is short and a size of data that can be transmitted is small. Alternatively, when the wireless base station 20 is set in a parking lot or when the wireless base station 20 is set on a road side and in a period of time when congestion occurs, it is conceivable to include, in the beacon, subscription information for requesting data with a large size as well. This is because time when the vehicle 10 and the wireless base station 20 can communicate is long and a size of data that can be transmitted is large.

The wireless base station 20 may preferentially deliver subscription information generated by a specific generator. For example, it is assumed that the vehicle 10 is a share car operated by a car share company. Information collected by the vehicle 10 includes information useful for the car share company and information useful for a car manufacturer. In general, these kinds of information are different. Therefore, the car share company and the car manufacturer respectively transmit different kinds of subscription information. Therefore, the wireless base station 20 preferentially delivers subscription information of a generator having a preferential contract. When the wireless base station 20 has a contract with the car share company, the wireless base station 20 preferentially stores subscription information generated by the car share company in a beacon and transmits the subscription information. On the other hand, when the wireless base station 20 has a contract with the car manufacturer, the wireless base station 20 preferentially stores subscription information generated by the car manufacturer in the beacon and transmits the subscription information. Consequently, the car share company and the car manufacturer can preferentially acquire information desired by the car share company and the car manufacturer. Note that subscription information, a generator of which is a contractor, is not only preferentially transmitted but subscription information including attribute information designated by the contractor may be preferentially transmitted. When a type of information needed by the contractor is known, subscription information for requesting such information may be preferentially transmitted.

It is also effective to determine on the basis of a hop count of subscription information which subscription information is transmitted. In this case, it is preferable to store the hop count in the subscription information. It is conceivable that the wireless base station 20 preferentially stores subscription information with a small hop count in a beacon frame and transmits the subscription information. Consequently, it is possible to acquire and pass information desired by a node with a small hop count, that is, a node located near the wireless base station 20. Preferential transmission of the subscription information with a small hop count may be realized, for example, by reducing a transmission probability as the number of hop counts is larger or by not transmitting the subscription information when the hop count is a certain fixed count or more.

When large data such as an image is encoded, fragmented, and transmitted as in network coding, it is also possible to effectively apply the present invention. It is conceivable to calculate hash values of acquired fragmented information, calculate an OR for each bit to create a bloom filter, store the bloom filter in a beacon frame, and transmit the bloom filter. By using the bloom filter, it is possible to easily learn fragmented information not acquired by the wireless base station 20 yet. Therefore, when the vehicle 10 has fragmented information not acquired by the wireless base station 20 yet, it is efficient if the vehicle 10 establishes wireless connection and transmits the fragmented information.

In the example explained above, the wireless communication system including the vehicle-mounted terminal is explained as the example. However, the configuration of a specific communication system is not limited to this. For example, the present invention is also applicable to a system including any movable wireless communication apparatus other than the vehicle. The movable wireless communication apparatus is, for example, a wireless communication apparatus installed in a vehicle, a ship, an airplane, or the like or a wireless communication device portable by a user such as a notebook computer, a slate-type (tablet) computer, or a cellular phone. It goes without saying that a communication device is not necessarily movable. The present invention is also applicable to a system (a sensor network, etc.) configured from a stationary wireless communication apparatus.

In the present invention, what kind of information is collected using subscription information is not particularly limited. For example, a situation is assumed in which, when the database server 30 periodically collects traffic information, information on a certain day of the week at a certain specific crossing cannot be acquired for a while. In such a case, to preferentially collect the information on the day of the week at the crossing, it is conceivable to preferentially transmit, with a control frame, subscription information indicating that the information is necessary. Alternatively, conversely, when information at a specific crossing can be sufficiently collected, it is conceivable to preferentially transmit, with a control frame, subscription information indicating that the information is unnecessary. A situation is assumed in which a traffic accident occurs in a period of time in a certain area. In such a case, in order to preferentially collect information of a drive recorder including a camera video photographed near an accident occurrence point around accident occurrence time, it is conceivable to preferentially transmit, with a control frame, subscription information indicating that the information is necessary. When it is desired to collect any sensor information, a generator of which is a stationary sensor node that monitors a bridge and a landslide, it is conceivable to preferentially transmit, with a control frame, subscription information including attribute information indicating that the information generator is the sensor node.

The invention claimed is:

1. A communication method in a wireless communication system configured from a wireless connection providing apparatus that provides wireless connection and a wireless communication apparatus capable of performing wireless communication with the wireless connection providing apparatus, the communication method comprising:
  acquiring, by the wireless connection providing apparatus, subscription information for specifying necessary information;
  generating, by the wireless connection providing apparatus, a control frame configured to notify surroundings of a presence of the wireless connection providing apparatus, the control frame including the subscription information having a plurality of attribute information including at least one of: (i) a producer of the necessary information, (ii) a generation place of the necessary information, and (iii) a generation time of the necessary information;
  transmitting, by the wireless connection providing apparatus, the control frame;

receiving, by the wireless communication apparatus, the control frame;

determining, by the wireless communication apparatus, whether the wireless communication apparatus retains information, which is specified as being necessary by the subscription information included in the control frame; and establishing, by the wireless communication apparatus, connection to the wireless connection providing apparatus, and transmitting the information, in response to a determination that the wireless communication apparatus retains the information.

2. The communication method according to claim 1, wherein
a wireless communication system of communication between the wireless connection providing apparatus and the wireless communication apparatus is a wireless LAN, and
including the subscription information in the control frame comprises including the subscription information in an ESSID of a beacon.

3. The communication method according to claim 1, wherein
the connection between the wireless connection providing apparatus and the wireless communication apparatus is established by a procedure conforming to a Hotspot 2.0 standard, and
including the subscription information in the control frame comprises including the subscription information in an Operator Friendly Name in an ANQP Response.

4. The communication method according to claim 1,
wherein acquiring the subscription information comprises receiving the subscription information from a database server, and
wherein the communication method further comprises
transmitting, by the wireless connection providing apparatus, the information, which is transmitted from the wireless communication apparatus, to the database server.

5. The communication method according to claim 4, further comprising accumulating, by the wireless connection providing apparatus, the information transmitted from the wireless communication apparatus and collectively transmitting the information to the database server at predetermined timing.

6. The communication method according to claim 1, wherein
the wireless communication apparatus has a function of providing wireless connection, and
including, the wireless communication apparatus, the subscription information, which is included in the received control frame, in a control frame of the wireless connection provided by the wireless communication apparatus;
transmitting, by the wireless communication apparatus, the subscription information,
receiving, by the wireless communication apparatus, the information needed by the subscription information from a second wireless communication apparatus; and
transmitting, by the wireless communication apparatus, the information to the wireless connection providing apparatus.

7. The communication method according to claim 1, wherein attribute information representing an attribute of at least one of necessary information and unnecessary information is included in the subscription information.

8. The communication method according to claim 7, wherein the attribute information is included as a hash value in the subscription information.

9. The communication method according to claim 7, wherein an OR of hash values of a plurality of kinds of attribute information is included in the subscription information.

10. The communication method according to claim 1, wherein
acquiring the subscription information comprises acquiring a plurality of kinds of subscription information different from one another, and
including the subscription information in the control frame comprises changing the subscription information included in the control frame.

11. The communication method according to claim 1, wherein
a public key of an information request source is included in the subscription information, and
transmitting the information comprises encrypting the information in use of the public key included in the subscription information.

12. A wireless communication system comprising:
a wireless connection providing apparatus that provides wireless connection, the wireless connection providing apparatus including a processor configured to:
acquire subscription information for specifying necessary information;
generate a control frame configured to notify surroundings of a presence of the wireless connection providing apparatus, the control frame including the subscription information having a plurality of attribute information including at least one of: (i) a producer of the necessary information, (ii) a generation place of the necessary information, and (iii) a generation time of the necessary information; and
transmit the control frame, and
a wireless communication apparatus capable of performing wireless communication with the wireless connection providing apparatus, the wireless communication apparatus including a processor configured to:
receive the control frame;
determine whether the wireless communication apparatus retains information, which is specified as being necessary by the subscription information included in the control frame; and
establish connection to the wireless connection providing apparatus and then transmitting the information, in response to a determination that the wireless communication apparatus retains the information.

13. A wireless communication apparatus configured to communicate with a wireless connection providing apparatus, the wireless communication apparatus comprising:
a wireless network interface configured to perform wireless communication with the wireless connection providing apparatus; and
a processor configured to:
receive, from a wireless connection providing apparatus that provides wireless connection, a control frame notifying a presence of the wireless connection providing apparatus, the control frame including subscription information having a plurality of attribute information including at least one of: (i) a producer of the necessary information, (ii) a generation place of the necessary information, and (iii) a generation time of the necessary information;

determine whether the wireless communication apparatus retains information, which is specified as being necessary by the subscription information included in the control frame; and establish connection to the wireless connection providing apparatus and then transmit the subscription information, in response to a determination that the apparatus itself retains the information.

\* \* \* \* \*